US007349426B2

(12) United States Patent
Majidi-Ahy et al.

(10) Patent No.: US 7,349,426 B2
(45) Date of Patent: Mar. 25, 2008

(54) INTEGRATED, SELF-OPTIMIZING, MULTI-PARAMETER/MULTI-VARIABLE POINT-TO-MULTIPOINT COMMUNICATION SYSTEM [II]

(75) Inventors: Reza Majidi-Ahy, Los Altos, CA (US); Joseph Hakim, Sunnyvale, CA (US); Subir Varma, San Jose, CA (US)

(73) Assignee: Aperto Networks, Inc., Milpitas, CA (US)

( * ) Notice: Subject to any disclaimer, the term of this patent is extended or adjusted under 35 U.S.C. 154(b) by 380 days.

(21) Appl. No.: 10/407,138

(22) Filed: Apr. 3, 2003

(65) Prior Publication Data

US 2004/0032835 A1    Feb. 19, 2004

Related U.S. Application Data

(60) Division of application No. 09/620,826, filed on Jul. 21, 2000, which is a continuation-in-part of application No. 09/475,716, filed on Dec. 30, 1999, now Pat. No. 6,654,384.

(51) Int. Cl.
    *H04J 3/16*    (2006.01)
    *H04J 3/22*    (2006.01)

(52) U.S. Cl. .................................................. 370/465

(58) Field of Classification Search ................ 370/465, 370/252, 342, 441, 317, 322, 347, 469, 392, 370/337, 401, 353, 261, 264, 280, 321, 477, 370/389, 338, 349, 352; 455/414.1, 414.3, 455/424, 423, 436, 452.2, 277.2, 228.1, 517, 455/524, 466, 515, 277, 278, 562; 375/148, 375/261, 141, 142, 349; 704/206; 706/922, 706/13; 714/38

See application file for complete search history.

(56) References Cited

U.S. PATENT DOCUMENTS 4,755,924 A    7/1988    Hiroi (Continued)

FOREIGN PATENT DOCUMENTS

AU            767974        7/2001

(Continued)

OTHER PUBLICATIONS

Civanlar et al. "Self-Healing in Wideband Packet Networks." IEEE Network, 1990, pp. 35-39, vol. 4, No. 1, New York.

(Continued)

*Primary Examiner*—Wing Chan
*Assistant Examiner*—Prenell Jones
(74) *Attorney, Agent, or Firm*—Swernofsky Law Group PC

(57) ABSTRACT

An Integrated, Self-Optimizing, Multi-Parameter/Multi-Variable Point-to-Multipoint Communication System provides integrated adaptive and dynamic responsiveness for communication parameters related to multiple characteristics of wireless communication links for a single sender, a single receiver, and for sets of multiple senders and multiple receivers. The method and system are self-optimizing and adaptively and dynamically respond to results of attempts to optimize parameters related to multiple characteristics of wireless communication links. Multiple characteristics of wireless communication links are optimized simultaneously, in that the optimal set of values for a plurality of N characteristics, rather than N individual optimal values for each characteristic, is adaptively and dynamically selected. A wireless PHY layer and wireless MAC layer collectively include a set of communication parameters, which are adaptively modified by a BSC for communication with a plurality of CPE. The BSC adjusts communication with each CPE individually and adaptively in response to changes in communication characteristics.

3 Claims, 9 Drawing Sheets

U.S. PATENT DOCUMENTS

| | | |
|---|---|---|
| 4,811,420 A | 3/1989 | Avis et al. |
| 5,546,411 A | 8/1996 | Leitch et al. |
| 5,553,316 A | 9/1996 | Diepstraten et al. |
| 5,598,417 A | 1/1997 | Crisler et al. |
| 5,625,875 A | 4/1997 | Whinnett et al. |
| 5,669,066 A | 9/1997 | Borg et al. |
| 5,708,774 A | 1/1998 | Boden |
| 5,729,531 A | 3/1998 | Raith et al. |
| 5,752,164 A | 5/1998 | Jones |
| 5,757,813 A | 5/1998 | Raith |
| 5,808,760 A | 9/1998 | Gfeller |
| 5,818,839 A | 10/1998 | Sterne et al. |
| 5,831,984 A * | 11/1998 | Hottinen ............... 370/441 |
| 5,835,494 A | 11/1998 | Hughes et al. |
| 5,859,838 A | 1/1999 | Soliman |
| 5,896,411 A | 4/1999 | Ali et al. |
| 5,918,176 A | 6/1999 | Arrington, Jr. et al. |
| 5,938,734 A | 8/1999 | Yao et al. |
| 5,946,346 A | 8/1999 | Ahmed et al. |
| 5,995,496 A | 11/1999 | Honkasalo et al. |
| 6,005,852 A | 12/1999 | Kokko et al. |
| 6,006,073 A | 12/1999 | Glauner et al. |
| 6,041,295 A * | 3/2000 | Hinderks ............... 704/206 |
| 6,067,290 A | 5/2000 | Paulraj et al. |
| 6,084,904 A | 7/2000 | Wang et al. |
| 6,088,342 A | 7/2000 | Cheng et al. |
| 6,108,561 A | 8/2000 | Mallinckrodt |
| 6,119,010 A | 9/2000 | Labedz |
| 6,128,500 A | 10/2000 | Raghavan et al. |
| 6,141,565 A | 10/2000 | Feuerstein et al. |
| 6,141,567 A | 10/2000 | Youssefmir et al. |
| 6,144,653 A * | 11/2000 | Persson et al. ............ 370/337 |
| 6,154,489 A | 11/2000 | Kleider et al. |
| 6,172,970 B1 | 1/2001 | Ling et al. |
| 6,175,570 B1 | 1/2001 | Cukier et al. |
| 6,185,208 B1 * | 2/2001 | Liao ..................... 370/392 |
| 6,223,041 B1 | 4/2001 | Egner et al. |
| 6,236,647 B1 | 5/2001 | Amalfitano |
| 6,236,894 B1 | 5/2001 | Stoisits et al. |
| 6,252,881 B1 | 6/2001 | Samoylenko |
| 6,469,982 B1 | 10/2002 | Henrion et al. |
| 6,477,376 B1 | 11/2002 | Carter |
| 6,499,022 B1 | 12/2002 | Dittmar et al. |
| 6,567,420 B1 | 5/2003 | Tiedemann, Jr. et al. |
| 6,625,777 B1 | 9/2003 | Levin et al. |
| 6,650,630 B1 | 11/2003 | Haartsen |
| 6,654,384 B1 | 11/2003 | Reza et al. |
| 6,775,305 B1 | 8/2004 | Delvaux |
| 6,782,036 B1 | 8/2004 | Dowling et al. |
| 6,810,019 B2 | 10/2004 | Steudler |
| 6,829,473 B2 | 12/2004 | Ramon et al. |
| 6,842,445 B2 | 1/2005 | Ahmavaara et al. |
| 6,975,603 B1 | 12/2005 | Dicket et al. |
| 6,992,986 B2 | 1/2006 | Reza et al. |
| 7,206,292 B2 | 4/2007 | Majidi-Ahy et al. |
| 2002/0183010 A1 | 12/2002 | Catreaux et al. |
| 2003/0067903 A1 | 4/2003 | Jorgensen |
| 2003/0185154 A1 | 10/2003 | Mullendore et al. |
| 2004/0032835 A1 | 2/2004 | Majidi-Ahy et al. |
| 2004/0057387 A1 | 3/2004 | Yi et al. |
| 2006/0153094 A1 | 7/2006 | Majidi-Ahy et al. |
| 2007/0211646 A1 | 9/2007 | Majidi-Ahy et al. |

FOREIGN PATENT DOCUMENTS

| | | |
|---|---|---|
| AU | 200124639 B2 | 7/2001 |
| EP | 1247369 | 4/2007 |
| JP | 4107034 | 4/1992 |
| JP | 6284062 | 10/1994 |
| JP | 09-321665 | 12/1997 |
| JP | 11225133 | 8/1999 |
| JP | 11355253 | 12/1999 |
| JP | 3804930 B2 | 5/2006 |
| KR | 10-751432 | 8/2007 |
| WO | WO 98/59523 A2 | 12/1998 |
| WO | 197 28 469 A1 | 1/1999 |
| WO | WO 99/01959 A2 | 1/1999 |
| WO | WO 99/18685 A1 | 4/1999 |
| WO | WO 99/19995 | 4/1999 |
| WO | WO 99/20016 A1 | 4/1999 |
| WO | WO 99/41872 | 8/1999 |
| WO | WO 99/44341 A1 | 9/1999 |
| WO | WO 99/60742 A1 | 11/1999 |
| WO | WO 00/13362 A1 | 3/2000 |
| WO | WO 00/21157 A1 | 4/2000 |
| WO | WO 01/50633 A1 | 7/2001 |
| WO | WO 01/50669 A1 | 7/2001 |
| WO | WO 02/13447 A2 | 2/2002 |
| WO | WO 02/25856 A2 | 3/2002 |

OTHER PUBLICATIONS

Annamalai et al. "Analysis and optimization of adaptive multicopy transmission ARQ protocols for time-varying channels." IEEE Transactions on Communications, Oct. 1998, pp. 1356-1368, vol. 46, No. 10.

Inoue et al. "Link-adaptive resource scheduling for wireless message transport." IEEE Global Telecommunications Conference, Nov. 8-12, 1998, pp. 2223-2228, vol. 4, IEEE, New York, NY, U.S.A.

* cited by examiner

INTEGRATED, SELF-OPTIMIZING, MULTI-PARAMETER/MULTI-VARIABLE POINT-TO-MULTIPOINT COMMUNICATION SYSTEM [II]

CROSS REFERENCE TO RELATED APPLICATIONS

This application is a division of application Ser. No. 09/620,826, entitled "Integrated, Self-Optimizing, Multi-Parameter/Multi-Variable Point-to-Point Communication System", filed Jul. 21, 2000, which is a continuation-in-part of application Ser. No. 09/475,716, entitled "Integrated Self-Optimizing Multi-Parameter and Multi-Variable Point-to-Multipoint Communication", filed Dec. 30, 1999 now U.S. Pat. No. 6,654,384.

BACKGROUND OF THE INVENTION

1. Field of the Invention

This invention relates to wireless communication systems, such as those including adaptive point to multipoint wireless communication.

2. Related Art

Wireless communication between a sender and a receiver includes sending information using a wireless communication link, in which the sender modulates information onto a wireless communication channel (such as a frequency band reserved for wireless communication between the sender and the receiver), and the receiver demodulates that information from the wireless communication channel, so as to recover the original information. The wireless communication link includes multiple physical characteristics, including characteristics of the sender's equipment and the receiver's equipment, characteristics of objects on or near communication pathways between the sender and the receiver, and characteristics of other communications overlapping communication between the sender and the receiver.

One problem with known systems is that multiple physical characteristics of the communication link between the sender and receiver can change substantially over relatively short time durations (for example, the distance between the sender and receiver or the equipment used by the sender or receiver). This is particularly so for characteristics related to interference, such as co-channel interference (CCI), and for multipath and multipoint effects, such as refraction or reflection resulting in intrasymbol interference and intersymbol interference. Moreover, these multiple physical characteristics can change independently of one another, and can have substantial and relatively unpredictable effects on one another. Selection of a set of parameters with which to optimize the communication link for one such physical characteristic can therefore be rendered less than optimal by changes in other such physical characteristics. As a result, selection of a single set of such physical characteristics can result in relatively ineffective or inefficient communication between the sender and the receiver.

Accordingly, it would be advantageous to provide a technique for adaptive point to multipoint wireless communication, in which characteristics of the communication techniques between sender and receiver can be changed adaptively in response to changes in the characteristics of the physical communication media, that is not subject to drawbacks of the known art.

SUMMARY OF THE INVENTION

The invention provides a method and system for adaptive point to multipoint wireless communication. The method and system integrate adaptive and dynamic responsiveness for communication parameters related to multiple characteristics of wireless communication links, both for a single sender and a single receiver, and for sets of multiple senders and multiple receivers. Moreover, the method and system are selfoptimizing in the sense that they are adaptively and dynamically responsive to results of attempts to optimize parameters related to multiple characteristics of wireless communication links. In a preferred embodiment, multiple characteristics of wireless communication links are optimized simultaneously, in that the optimal set of values for a plurality of N characteristics, rather than N individual optimal values for each characteristic, is adaptively and dynamically selected.

In a first aspect of the invention, a wireless physical (PHY) layer and a wireless media-access-control (MAC) layer collectively include a set of communication parameters, each of which is adaptively modified by a base station controller (BSC) for communication with a plurality of customer premises equipment (CPE). The BSC adjusts communication with each CPE individually and adaptively in response to changes in communication characteristics, including both changes in communication characteristics between the BSC and each selected CPE, and changes in communication characteristics induced by concurrent communication between the BSC and multiple CPE. Particular communication characteristics adapted for can include physical characteristics (such as bit error rate), transport characteristics (such as amount of communication traffic), and application characteristics (such as the nature of an application for the communication traffic).

In a second aspect of the invention, a wireless transport layer includes adaptive and dynamic characteristics responsive to communication characteristics between the BSC and each selected CPE, and between the BSC and multiple CPE. In a preferred embodiment, these communication characteristics are responsive to each individual communication link so as to optimize communication bandwidth between the BSC and each selected CPE. These include (a) BSC control of a time division multiple access (TDMA) protocol, preferably time division duplex (TDD); (b) BSC control of frequency reuse for CPE, and (c) BSC control of spatial separation of line of sight (LOS), obstructed line of sight (OLOS), or non-line of sight (NLOS) communication paths with CPE; each responsive to measured bit error rate (BER) and requested communication bandwidth demand. The BSC provides point-to-point and point-to-multipoint wireless communication services using parameters continuously adaptive to current conditions, each individualized to one or more selected CPE.

The TDD aspect of the wireless transport layer includes burst mode messages from the BSC downstream to individual CPE, and similarly includes burst mode messages from individual CPE upstream to the BSC. This allows the BSC and each individual CPE to communicate so as to optimize throughput in a communication direction (downstream or upstream) for each communication link between the BSC and an individual CPE.

The invention provides an enabling technology for a wide variety of applications for communication, so as to obtain substantial advantages and capabilities that are novel and non-obvious in view of the known art. Examples described below primarily relate to a wireless communication system, but the invention is broadly applicable to many different types of communication in which characteristics of the communication link are subject to change.

DETAILED DESCRIPTION OF THE PREFERRED EMBODIMENT

Figure 1:
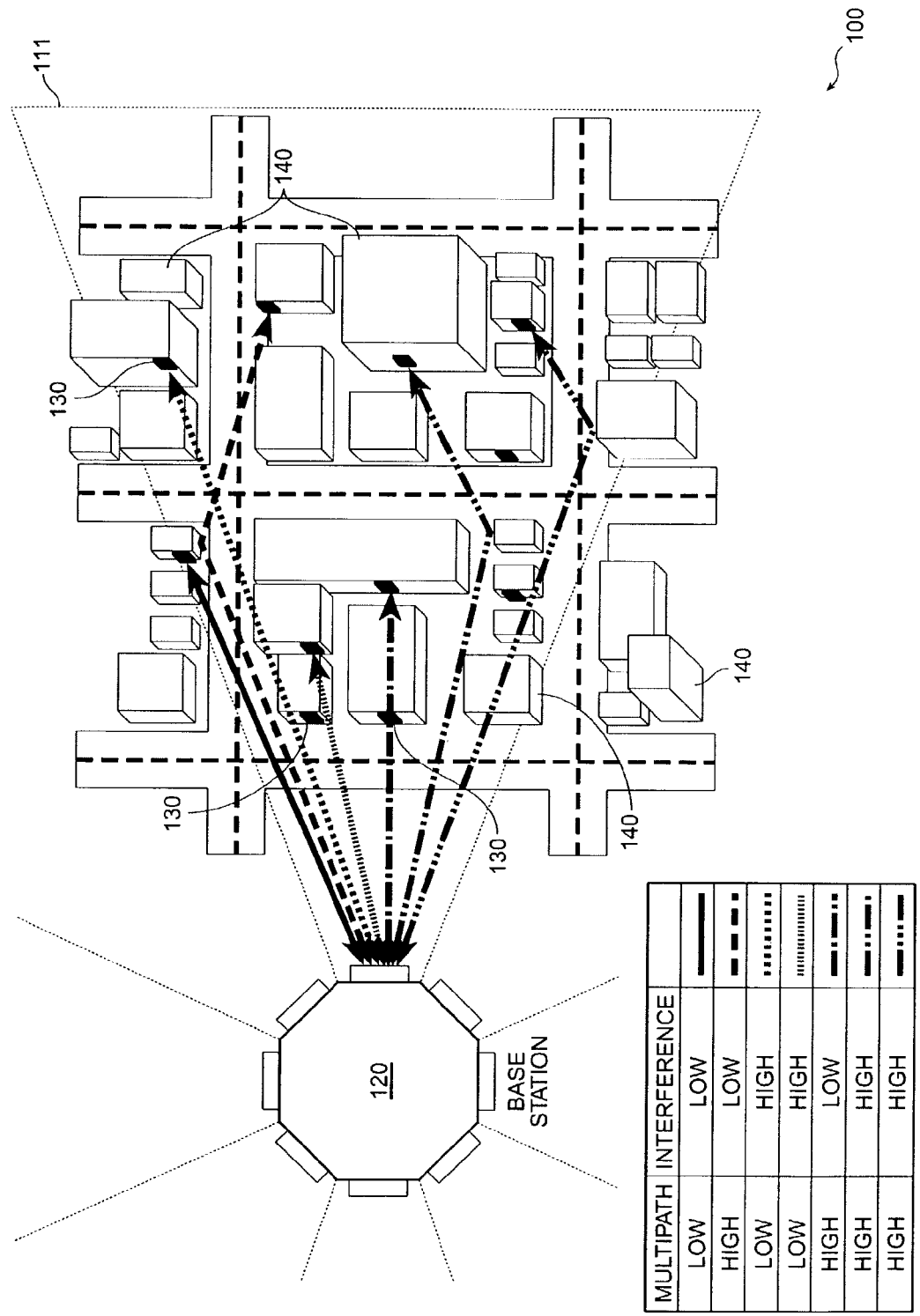
FIG. 1 shows a block diagram of a portion of a system using adaptive point to multipoint wireless communication.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Applications

Inventions described herein can be used in conjunction with inventions described in the following documents.

U.S. patent application Ser. No. 09/475,716, Express Mail Mailing No. EL524780021US, filed Dec. 30, 1999 in the name of Reza Majidi-Ahy and Subir Varma, titled "Integrated Self-Optimizing Multi Parameter and Multi Variable Point to Multi Point Communication"

U.S. patent application Ser. No. 09/475,642, Express Mail Mailing No. EL52478001US, filed Dec. 30, 1999 in the name of Subir Varma, Khuong Ngo, Jean Fuentes, Paul Truong, and Reza Majidi-Ahy, titled "Adaptive Link Layer for Point to Multipoint Communciation System"

U.S. patent application Ser. No. 09/540,674, Express Mail Mailing No. EL524781512US: filed Mar. 31, 2000, in the name of Reza Majidi-Ahy, titled "Robust Topology Wireless Communication Using Broadband Access Points"

and

U.S. patent application Ser. No. 09/604,784, Express Mail Mailing No. EL524781225US, filed Jun. 26, 2000, in the name of Reza Majidi-Ahy, titled "High-Capacity Scalable Integrated Wireless Backhaul for Broadband Access Networks."

Each of these documents is hereby incorporated by reference as if fully set forth herein. These documents are collectively referred to as the "Incorporated Disclosures."

Lexicography

The following terms refer or relate to aspects of the invention as described below. The descriptions of general meanings of these terms are not intended to be limiting, only illustrative.

base station controller (BSC)—in general, a device for performing coordination and control for a wireless communication cell. There is no particular requirement that the base station controller must be a single device; in alternative embodiments, the base station controller can include a portion of a single device, a combination of multiple devices, or some hybrid thereof.

communication link—in general, an element for sending information from a sender to a recipient. Although in a preferred embodiment the communication links referred to are generally wireless line of sight point to point communication links, there is no particular requirement that they are so restricted.

customer premises equipment (CPE)—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

IP parameters—in general, a set of characteristics or parameters relating to an IP layer for a communication link.

media-access-control (MAC) parameters—in general, with reference to a wireless communication link, a set of characteristics or parameters relating to media access control of a communication link. For example, MAC parameters can include (a) a number of payload data bytes assigned per message, (b) a frequency of acknowledgement messages and a number of message retransmission attempts, (c) a fraction of the communication link allocated to downstream versus upstream communication, and the like.

physical (PHY) parameters—in general, with reference to a wireless communication link, a set of characteristics or parameters relating to physical transmission of information on a communication link. For example, physical characteristics can include (a) a symbol transmission rate, (b) a number of payload data bits assigned per symbol, (c) a number of error detection or correction bits assigned per symbol, and the like.

QoS parameters—in general, a set of characteristics or parameters relating to QoS (quality of service) for a communication link.

wireless communication system—in general, a communication system including at least one communication link that uses wireless communication techniques.

wireless transport layer—in general, a set of protocols and protocol parameters for sending and receiving information using wireless transport. In a preferred embodiment, the wireless transport layer is part of a multilayer systems architecture, in which the wireless transport layer is built using a physical transport layer, and the wireless transport layer is used by a logical transport layer such as IP.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

The context of the invention is similar to that of the Incorporated Disclosures.

A system using adaptive point to multipoint wireless communication in a wireless communication system operates as part of a system in which devices coupled to a network (such as a computer network) send messages, route and switch messages, and receive messages. In a preferred embodiment, devices coupled to (and integrated with) the network send, route, and receive these messages as sequences of packets, each of which has a header including delivery information and a payload including data. In a preferred embodiment, packet format conforms to the OSI model, in which an application protocol (layer 5, such as FTP), uses a transport protocol (layer 4, such as TCP), which uses a network protocol (layer 3, such as IP), which uses a media access control (MAC) protocol (layer 2), which uses a physical transport technique (layer 1).

The system using adaptive point to multipoint wireless communication is described herein with regard to layer 1 and layer 2, particularly as it applies to interactions between layer 1 and layer 2 and between those layers and layer 3. However, concepts and techniques of the invention are also applicable to other layers of the OSI model. The application gives examples of cases where the type of application in the application layer (layer 5) could be incorporated into embodiments of the invention to improve communication. Adapting those concepts and techniques to such other layers would not require undue experimentation or further invention, and is within the scope and spirit of the invention.

System Elements

FIG. 1 shows a block diagram of a portion of a system using adaptive point to multipoint wireless communication.

A system 100 includes a wireless communication cell 110 (or a portion thereof), a base station controller (BSC) 120, one or more customer premises equipment (CPE) 130, and one or more (possibly partially) interfering or reflecting obstacles 140.

The wireless communication cell 110 (not shown) includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

In FIG. 1, a portion of the cell 110, herein called a "sector" 111, includes a generally triangular-shaped region of local surface area, disposed so that a set of six sectors 111 are combined to form a single cell 110. Thus, the BSC 120 is disposed at or near one corner of the sector 111, while CPE 130 are disposed within the sector 111. Moreover, obstacles 140 are disposed within the sector 111 or at junctions of multiple sectors 111.

Although the invention is primarily described with regard to a single sector 111, there are substantial applications of the invention to interaction between multiple sectors 111 within a cell 110, and to interaction between sectors 111 in multiple cells 110. These substantial applications of the invention are described at least in part in this application. Moreover, other and further substantial applications of the invention with regard to multiple sectors 111, both within a single cell 110 and among multiple cells 110, would be clear to those skilled in the art of wireless communication after perusal of this application, and would not require undue experimentation or further invention.

The BSC 120 includes a processor, program and data memory, mass storage, and one or more antennas for sending or receiving information using wireless communication techniques.

Similar to the BSC 120, each CPE 130 includes a processor, program and data memory, mass storage, and one or more antennas for sending or receiving information using wireless communication techniques.

Obstacles 140 might include buildings, other construction, electromagnetically active elements such as radio transmitters and repeaters, other electromagnetic elements such as power lines or weather effects, and mobile objects such as vehicles.

Mobile objects can serve as obstacles, due to their electromagnetic characteristics, size, or other features. For example, a car or truck can present an obstacle that dampens or prevents transmission of wireless communication. Similarly, an airplanes, dirigibles, or trucks can present surfaces with continual or intermittent reflective features, possibly leading to multipath effects. Moving obstacles 140 can present substantial variation over time in characteristics of communication links between the BSC 120 and selected CPE 130.

Similarly, non-moving obstacles 140 can also present substantial variation over time in characteristics of communication links between the BSC 120 and selected CPE 130. For example, the electromagnetic reflectivity characteristics of a building might vary with regard to power usage in the building, ambient temperature, and other factors.

Other and further substantial applications of the invention with regard to both moving and non-moving obstacles 140, both within a single cell 110 and among multiple cells 110, would be clear to those skilled in the art of wireless communication after perusal of this application, and would not require undue experimentation or further invention.

Communication among devices within the wireless communication cell 110 is preferably conducted on a one-to-one basis between each CPE 130 and the BSC 120. Thus, the BSC 120 communicates with each CPE 130, and each CPE 130 communicates with the BSC 120. In a preferred embodiment, CPE 130 do not communicate directly with other CPE 130. However, in alternative embodiments, CPE 130 may communicate directly with other CPE 130, with the characteristics of such communication being controlled either by the BSC 120, by one CPE 130 selected by the BSC 120, or by one CPE 130 mutually agreed to among the communicating CPE 130.

Communication between the BSC 120 and each CPE 130 is conducted using a TDD technique, in which time durations are divided into repeated individual frames, each one of which includes a "downstream" portion and an "upstream" portion. Unlike existing protocols in which transmissions are controlled by the transmitting side, the BSC 120 controls transmissions for both upstream and downstream directions, without specific requests from CPE 130.

During the downstream portion of each frame, the BSC 120 transmits, thus sending information to one or more CPE 130. During the upstream portion of each frame, each CPE 130 is potentially allocated a time slot for transmission, thus for sending information to the BSC 120. TDD techniques are known in the art of wireless communication.

Adaptive Point to Multipoint Communication

The BSC 120 maintains a set of physical (PHY) parameters and media-access-control (MAC) parameters for each CPE 130. In a preferred embodiment, control of each parameter by the BSC 120 is independent and individual with regard to each CPE 130. Thus for example, the BSC 120 determines power level and modulation type for each CPE 130 without regard to power level and modulation type for any other CPE 130. Similarly, the BSC 120 determines power level for a particular CPE 130 without regard for modulation type for that particular CPE 130.

However, in alternative embodiments, the BSC 120 may control multiple parameters in groups, or in a correlated manner. Thus, the BSC 120 may alternatively determine power level and modulation type for a particular CPE 130 as a pair of values, where the pair of values is determined so that an optimal pair (rather than optimal individual values) is selected. For example, the BSC 120 may notice that a particular CPE 130 needs substantially less transmission power level when using a more robust modulation type, and thus select the power level and modulation type parameters for that particular CPE 130 jointly so as to be optimal as a pair, rather than as individual values.

In further alternative embodiments, the BSC 120 may control parameters for multiple CPE 130 in groups, or in a correlated manner. Thus, the BSC 120 may alternatively select a group of more than one CPE 130 and control physical parameters and MAC parameters for the group as a whole, where the parameters are determined so as to be optimal for the group, rather than for individual CPE 130. For example, the BSC 120 might notice that two CPE 130 A and B can generate substantial co-channel interference under selected conditions, and therefore set the channel selection parameters for those two CPE 130 A and B to avoid that co-channel interference.

As a further alternative embodiment of controlling parameters for multiple CPE 130 in groups, the BSC 120 may control parameters so that (for a group of N CPE 130), some portion M of those CPE 130 have a first set of parameters, while some other portion (N−M) of those CPE 130 have a second set of parameters, so that communication with the entire group of N CPE 130 is optimal. For example, the BSC 120 may determine, for N=10 CPE 130, that M=9 of those CPE 130 communicate with the BSC 120 at 20 megasymbols per second, while the remaining (N−M)=1 of those CPE 130 communicate with the BSC 120 at 5 megasymbols per second, so that allocated resources are minimized for communication with the entire group of N=10 CPE 130.

In a preferred embodiment, each of the following parameters actually has two values: a first value for transmission by the BSC 120 and a second value for transmission by the CPE 130. Thus, the BSC 120 can transmit using a first set of parameters while the CPE 130 is instructed to transmit using a second set of parameters. There is no particular requirement that the first set of parameters and the second set of parameters need be correlated, except for optimizations desirable due to the nature of the communication link between the BSC 120 and the CPE 130.

In alternative embodiments, the optimizations selected by the BSC 120 may be responsive to optimizations or requirements imposed by higher levels in the OSI model. For example, there are instances noted below in which, if the application level is transmitting voice information or other streaming media, a first set of parameters would be considered optimal; while if the application level is transmitting file data or other relatively cohesive information, a second set of parameters would be considered optimal.

Preferred Parameters

Figure 2:
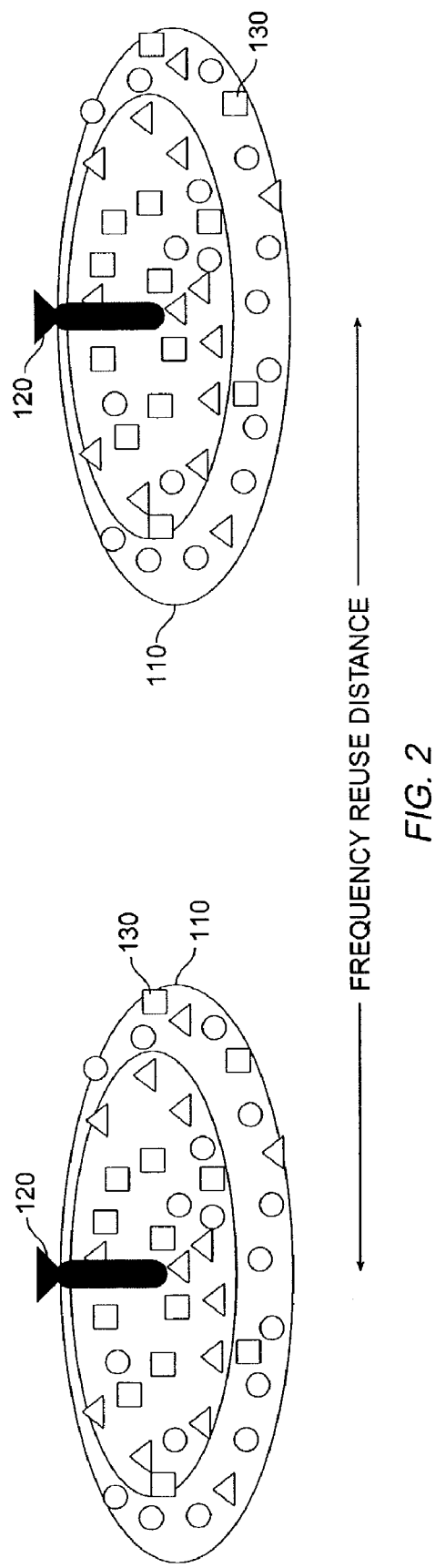
FIG. 2 shows an example of adaptive frequency reuse provided by the BSC in response to robust modulation at the boundary of a cell or a sector.

FIG. 2 shows an example of adaptive frequency reuse provided by the BSC in response to robust modulation at the boundary of a cell 110 or a sector 111.

The BSC 120 optimizes its communication link with each selected CPE 130 so as to provide (a) robust link performance, (b) avoidance of interference, (c) avoidance of multipath effects, (d) amelioration of obstructed or partially obstructed LOS, so as to maximizing bandwidth throughput to each selected CPE 130.

The BSC 120 notes the effect of frequency separation between pairs of CPE 130, so as to optimize frequency division multiple access (FDMA), such as frequency division duplex (FDD) techniques. For example, in a preferred embodiment, the BSC 120 provides for spatially closer frequency reuse when relatively lesser frequency separation between pairs of CPE 130 is adequate to provide sufficient communication bandwidth.

Similarly, the BSC 120 notes the effect of both spatial and frequency separation between pairs of CPE 130, so as to optimize time division multiple access (TDMA), such as time division duplex (TDD) techniques. For example, in a preferred embodiment, the BSC 120 provides for temporal allocation of each TDD frame when relatively lesser temporal separation between pairs of CPE 130 is adequate to provide sufficient communication bandwidth.

In alternative embodiments, the BSC 120 may note the effect of spatial, frequency and time separation between pairs of CPE 130, so as to optimize code division multiple access (CDMA), or other spread spectrum techniques, or other techniques available for sharing communication channels among a plurality of communicating entities.

In a preferred embodiment, physical parameters and MAC parameters include at least the following physical parameters:

antenna selection—The BSC 120 includes more than one antenna, and each CPE 130 includes one or more antennas. In a preferred embodiment, the antenna selection parameter includes a choice of which one antenna at the BSC 120 and which one antenna at the each CPE 130.

The antenna selection parameter allows the BSC 120 to optimize a communication link with a selected CPE 130 in response to both interference effects and multipath effects.

In a preferred embodiment, the antenna selection parameter is supplemented using an antenna polarization parameter. The antenna selection parameter allows the BSC 120 to optimize a communication link with a selected CPE 130 in response to both interference effects and multipath effects.

In alternative embodiments, the antenna selection parameter includes the possibility of sending portions of communication signal from each of a plurality of antennas (thus, either simultaneously sending from two antennas or sending from one antenna followed by a second antenna) and similarly receiving portions of communication signal at each of a plurality of antennas.

Figure 3:
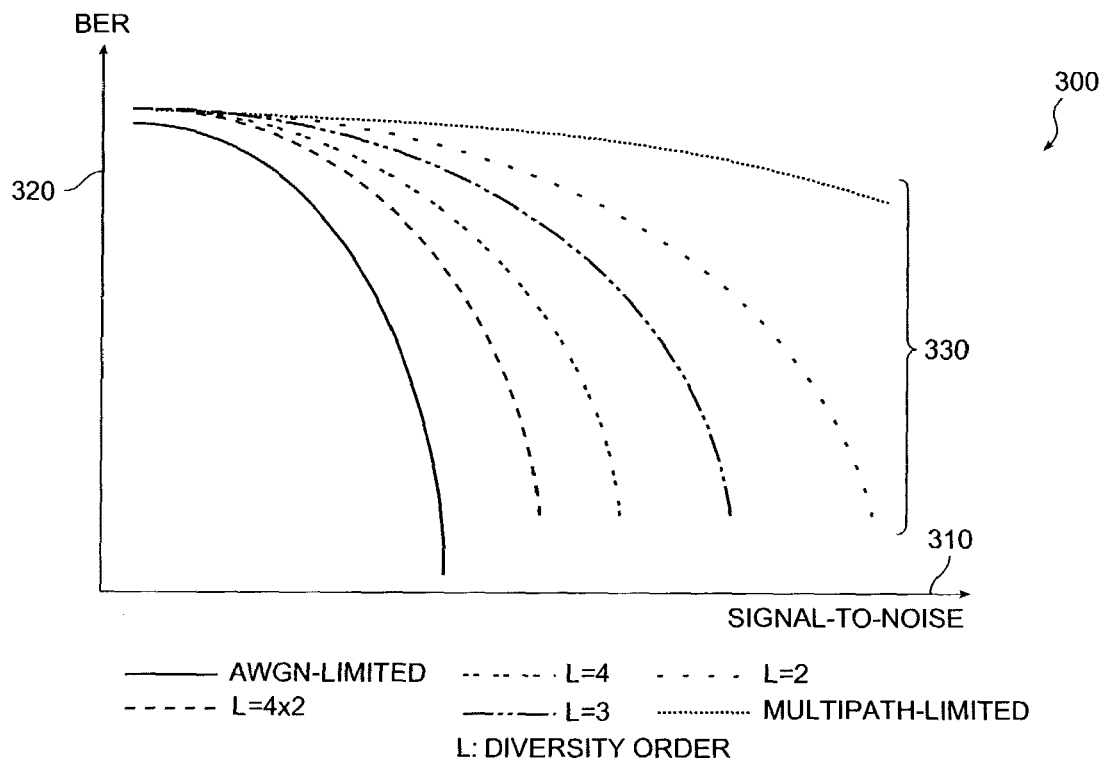
FIG. 3 shows a chart of reduced bit error rate (BER) and signal to noise (STN) ratio provided by the BSC using antenna selection, antenna polarization selection, and antenna diversity selection.

FIG. 3 shows a chart of reduced bit error rate (BER) and signal to noise (STN) ratio provided by the BSC using antenna selection, antenna polarization selection, and antenna diversity selection.

A chart 300 includes an X-axis 310 representing a signal to noise (STN) ratio, a Y-axis 320 representing a bit error rate (BER) value, and a set of plotted curves 330 each representing a function coupling STN on the X-axis 310 with BER on the Y-axis 320 for a selected value of an antenna diversity selection parameter (labeled L=diversity order in FIG. 3).

In a preferred embodiment, the BSC 120 selects, for each communication link with selected CPE 130, an antenna diversity selection parameter for the communication link. It would be clear to those of ordinary skill in the art, after perusal of this application, that selection of the antenna diversity selection parameter, and other antenna selection parameters, is a tool for the BSC 120 to maximize the value of its communication link with each selected CPE 130.

Figure 4:
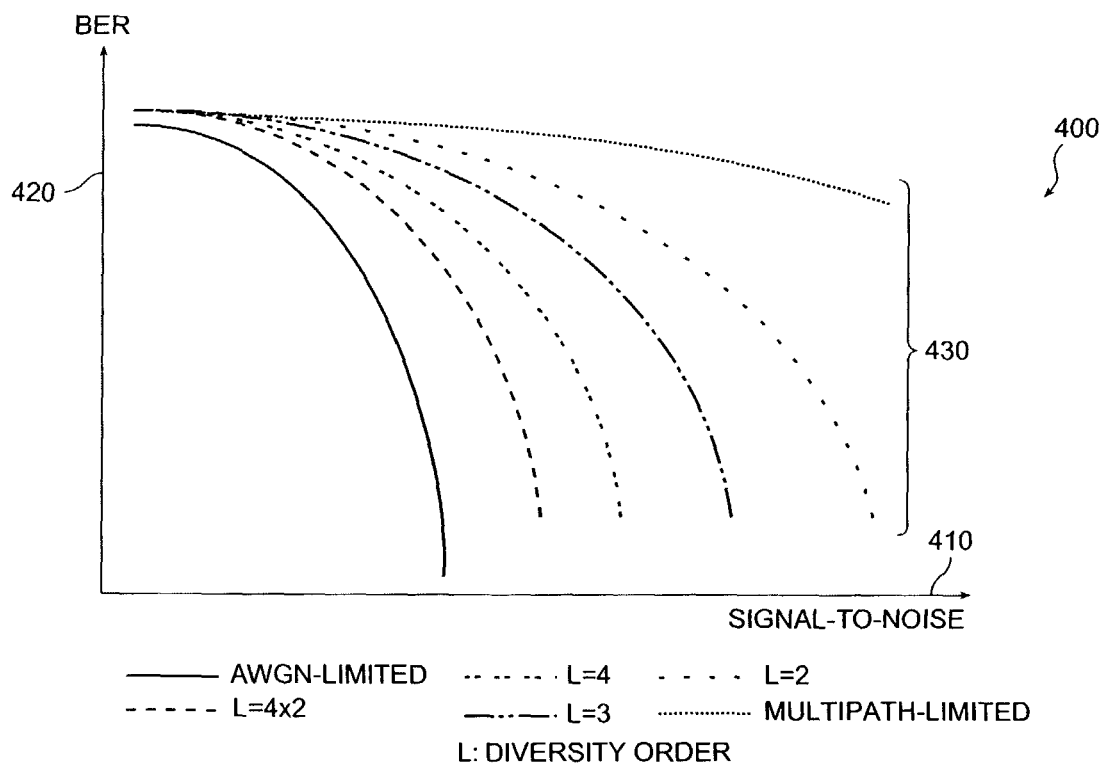
FIG. 4 shows a chart of reduced bit error rate (BER) and signal to interference (STI) ratio provided by the BSC using antenna selection, antenna polarization selection, and antenna diversity selection.

FIG. 4 shows a chart of reduced bit error rate (BER) and signal to interference (STI) ratio provided by the BSC 120 using antenna selection, antenna polarization selection, and antenna diversity selection.

A chart 400 includes an X-axis 410 representing a signal to interference (STI) ratio, a Y-axis 420 representing a bit error rate (BER) value, and a set of plotted curves 430 each representing a function coupling STI on the X-axis 410 with BER on the Y-axis 420 for a selected value of an antenna diversity selection parameter (labeled L=diversity order in FIG. 3).

In a preferred embodiment, the BSC 120 selects, for each communication link with selected CPE 130, an antenna diversity selection parameter for the communication link. It would be clear to those of ordinary skill in the art, after perusal of this application, that selection of the antenna diversity selection parameter, and other antenna selection parameters, is a tool for the BSC 120 to maximize the value of its communication link with each selected CPE 130.

power level—The BSC 120 sets the power allocated for transmission.

The power level parameter allows the BSC 120 to optimize a communication link with a selected CPE 130 in response to interference effects.

Figure 5:
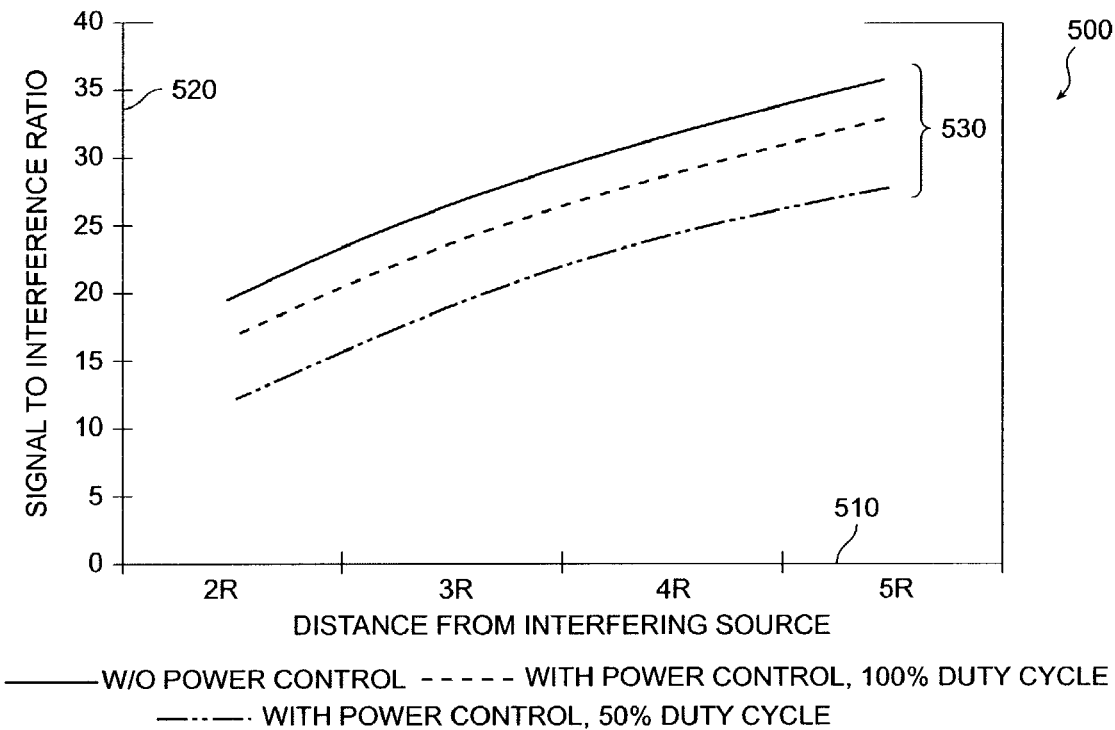
FIG. 5 shows a chart of reduced signal to interference (STI) ratio provided by the BSC using power level parameter selection.

FIG. 5 shows a chart of reduced signal to interference (STI) ratio provided by the BSC 120 using power level parameter selection.

A chart 500 includes an X-axis 510 representing a distance from interference source, a Y-axis 520 representing a signal to interference (STI) ratio, and a set of plotted curves 530 each representing a function coupling distance from interference source on the X-axis 510 with STI on the Y-axis 520 for a selected value of an antenna diversity selection parameter (labeled L=diversity order in FIG. 3). A first curve 530 shows a relationship function without power level selection by the BSC 120; a second curve 530 shows a relationship function with power level selection by the BSC 120 simultaneously at both the BSC 120 and the selected CPE 130; and a third curve 530 shows a relationship function with power level selection by the BSC 120 independently at each of the BSC 120 and the selected CPE 130.

In a preferred embodiment, the BSC 120 selects, for each communication link with selected CPE 130, a power level selection parameter for the communication link. It would be clear to those of ordinary skill in the art, after perusal of this application, that selection of the power level selection parameter, is a tool for the BSC 120 to maximize the value of its communication link with each selected CPE 130.

channel selection—The communication link includes more than one frequency channel on which transmissions are sent and received. In a preferred embodiment, the channel selection parameter includes a choice of which one channel the BSC 120 uses to transmit and which one channel the each CPE 130 transmit.

The channel selection parameter allows the BSC 120 to optimize a communication link with a selected CPE 130 in response to both interference effects and multipath effects.

Similar to antenna selection, in alternative embodiments, the channel selection parameter includes the possibility of sending portions of communication signal from each of a plurality of channels (thus, either simultaneously sending from two channels or sending from one channel followed by a second channel) and similarly receiving portions of communication signal at each of a plurality of channels.

In alternative embodiments, the communication link may include other types of channel other than frequency division (FDMA), such as spread spectrum code division (CDMA), or some combination of transmission separation techniques, such as a combination of CDMA, FDMA, and TDMA techniques. In such alternative embodiments, the channel selection parameter includes the possibility of selecting one or more of such separation techniques either independently or jointly.

modulation type—The BSC 120 and the CPE 130 can exchange information at one of a number of different bit per symbol rates, as determined by the modulation type for transmission of information. In a preferred embodiment, the modulation type parameter selects between QPSK, 16QAM, and 64QAM modulation techniques. When the modulation type is QPSK, two bits are transmitted for each symbol. Similarly, when the modulation type is 16QAM, four bits are transmitted for each symbol, and when the modulation type is 64QAM, six bits are transmitted for each symbol.

The modulation selection parameter allows the BSC 120 to optimize a communication link with a selected CPE 130 in response to both interference effects and multipath effects.

In alternative embodiments, the modulation type may include other techniques for modulation, such as QFSK or other frequency modulation techniques, spread spectrum modulation techniques, or some combination thereof.

Figure 6:
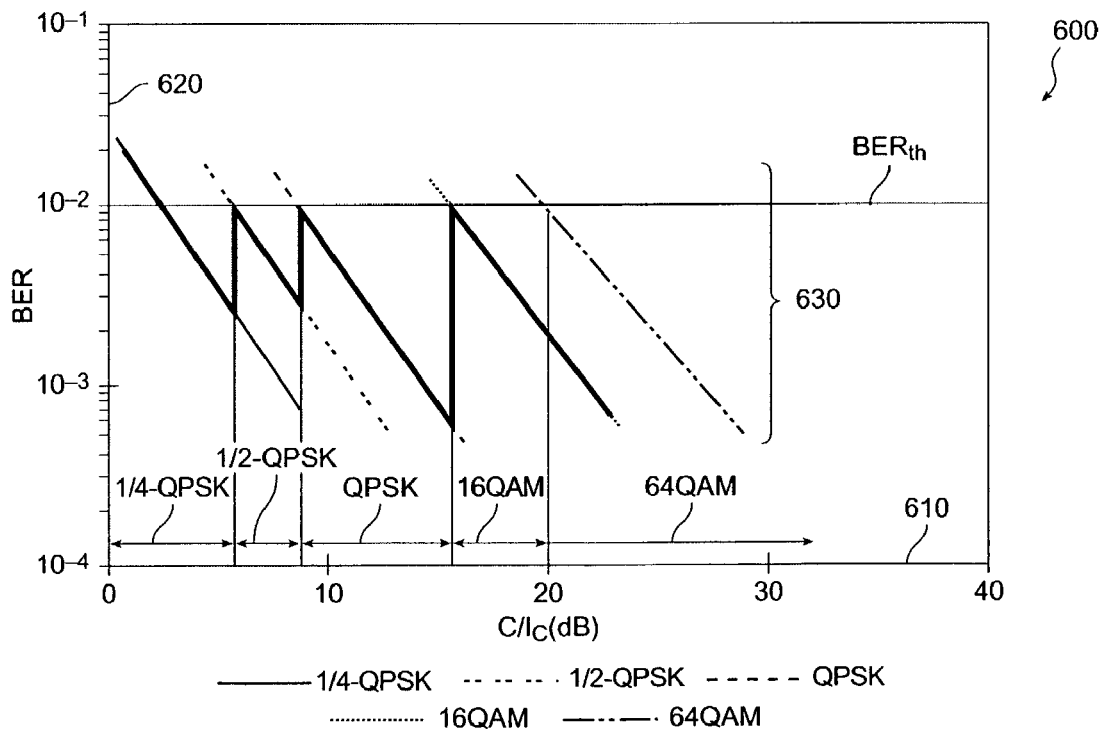
FIG. 6 shows a chart of reduced bit error rate (BER) ratio provided by the BSC using modulation and symbol rate selection.

FIG. 6 shows a chart of reduced bit error rate (BER) ratio provided by the BSC using modulation and symbol rate selection.

A chart 600 includes an X-axis 610 representing a $C/I_C$ ratio in decibels (db), a Y-axis 620 representing a bit error rate (BER), and a set of plotted curves 630 each representing a function coupling $C/I_C$ ratio on the X-axis 610 with BER on the Y-axis 620 for a selected value of a modulation parameter. The modulation parameter can vary among ¼-QPSK, ½-QPSK, QPSK, 16QAM, and 64QAM.

In a preferred embodiment, the BSC 120 selects, for each communication link with selected CPE 130, a modulation selection parameter for the communication link. It would be clear to those of ordinary skill in the art, after perusal of this application, that selection of the modulation and symbol rate selection parameter, is a tool for the BSC 120 to maximize the value of its communication link with each selected CPE 130.

Figure 7:
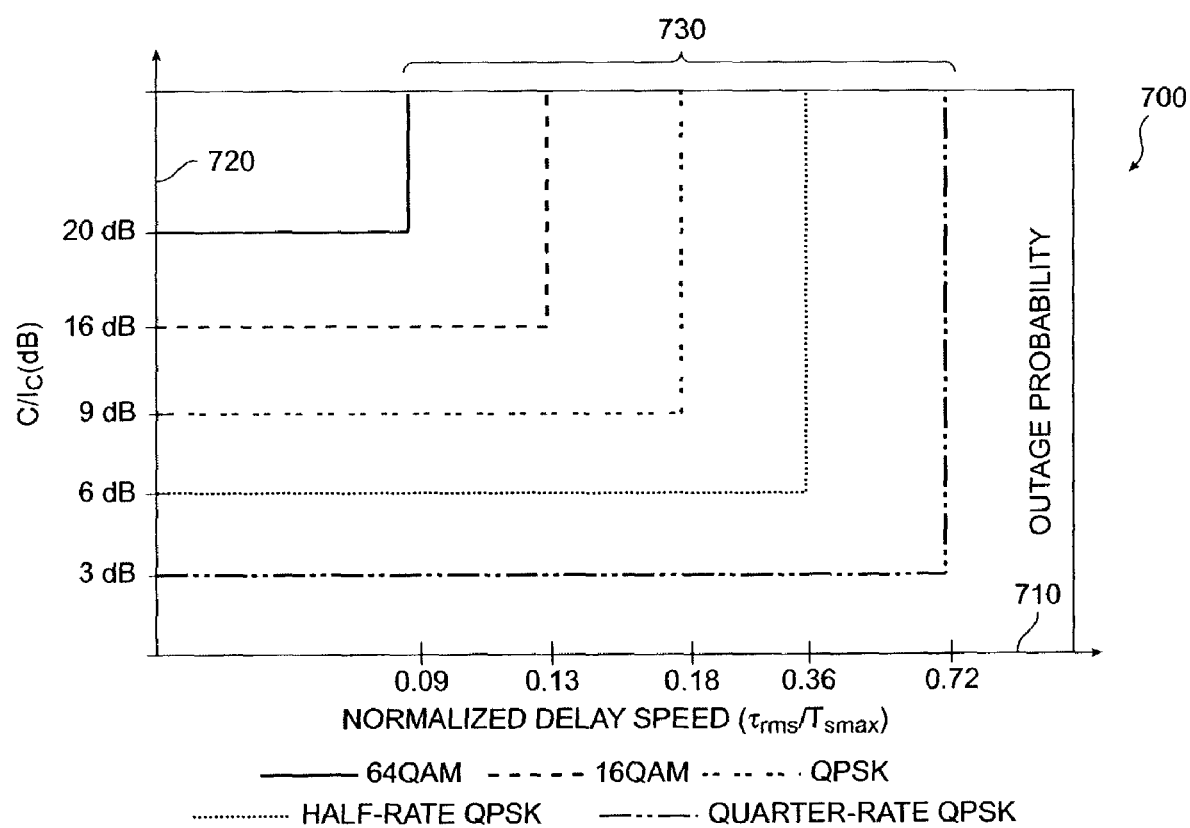
FIG. 7 shows a chart of reduced outage probability provided by the BSC 120 using modulation and symbol rate selection.

FIG. 7 shows a chart of reduced outage probability provided by the BSC 120 using modulation and symbol rate selection.

A chart 700 includes an X-axis 710 representing a normalized delay spread between symbols, a Y-axis 720 representing a $C/I_C$ ratio in decibels (db), and a set of plotted regions 730 each representing a function coupling normalized delay spread on the X-axis 710 with $C/I_C$ ratio on the Y-axis 720 for a selected value of a modulation and symbol rate parameter. The modulation parameter can vary among ¼-QPSK, ½-QPSK, QPSK, 16QAM, and 64QAM.

In a preferred embodiment, the BSC 120 selects, for each communication link with selected CPE 130, a modulation and symbol rate selection parameter for the communication link. It would be clear to those of ordinary skill in the art, after perusal of this application, that selection of the modulation and symbol rate selection parameter, is a tool for the BSC 120 to maximize the value of its communication link with each selected CPE 130.

symbol rate—The BSC 120 and the CPE 130 can exchange information at one of a number of different symbol per second rates, as determined by the symbol rate for transmission of information. In a preferred embodiment, the symbol rate parameter selects between transmission rates of five, ten, or twenty megasymbols per second.

The symbol rate parameter allows the BSC 120 to optimize a communication link with a selected CPE 130 in response to both interference effects and multipath effects.

error code type—The BSC 120 and the CPE 130 can exchange information using one of a number of different error detection and correction techniques. These error detection and correction techniques can include past error detection and correction and forward error detection and correction. Various codes and techniques for error detection and correction are known in the art of information science. In a preferred embodiment, the error code type parameter selects between Reed-Solomon codes encoding N payload bits using a block of M transmitted bits, where M is greater than or equal to N. However, in alternative embodiments, other error codes could be used, such as Viterbi (concatenated) Turbo codes, MD5 or secure hash codes, or other error codes adaptable to variations in channel, subscriber, or time.

The error code parameter allows the BSC 120 to optimize a communication link with a selected CPE 130 in response to both interference effects and multipath effects.

Figure 8:
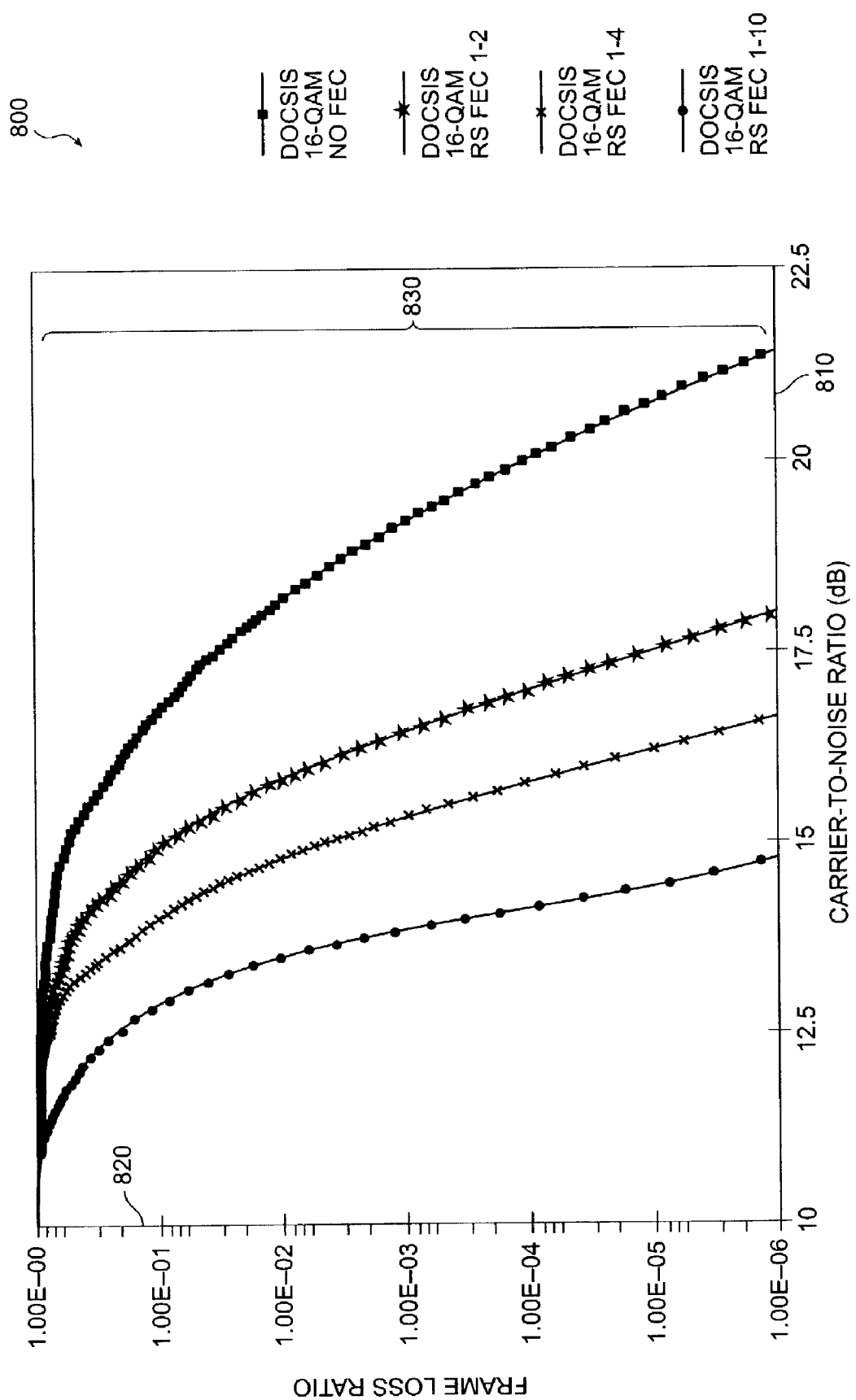
FIG. 8 shows a chart of reduced frame loss ratio provided by the BSC 120 using modulation and error code selection.

FIG. 8 shows a chart of reduced frame loss ratio provided by the BSC 120 using modulation and error code selection.

A chart 800 includes an X-axis 810 representing a carrier to noise ratio (CNR) in decibels (db), a Y-axis 820 representing a frame-loss ratio (FLR), and a set of plotted curves 830 each representing a function coupling CNR on the X-axis 810 with FLR on the Y-axis 820 for a selected value of modulation parameter and error code parameter. The modulation parameter is shown as 16QAM; the error code parameter can vary among various strengths of Reid-Solomon codes.

In a preferred embodiment, the BSC 120 selects, for each communication link with selected CPE 130, a modulation selection parameter for the communication link. It would be clear to those of ordinary skill in the art, after perusal of this application, that selection of the modulation parameter and the error code parameter, is a tool for the BSC 120 to maximize the value of its communication link with each selected CPE 130.

equalization—When BSC 120 and the CPE 130 exchange information, the communication link between the two imposes an impulse response, so that a signal which is transmitted from the sender to the receiver is transformed in a substantially nonlinear manner. The impulse response is primarily due to multipath effects of communication between the sender and receiver, but can also be due to other frequency-diverse effects such as weather.

In a preferred embodiment, the BSC 120 and the CPE 130 include an equalizer element, which attempts to invert the impulse response of the communication link by pre-conditioning the signal before transmission. The equalizer element includes a sequence of coefficients for use in a finite impulse response (FIR) filter, or may include a sequence of coefficients for use in a polynomial for determining values for an infinite impulse response (IIR) filter. The equalization parameter thus includes the sequence of coefficients for the filter used for pre-conditioning the signal before transmission.

The equalization parameter allows the BSC 120 to optimize a communication link with a selected CPE 130 in response to multipath effects.

In a preferred embodiment, physical parameters and MAC parameters include at least the following MAC parameters:

message size—As described in the Incorporated Disclosures, the BSC 120 and the CPE 130 exchange information using (downstream or upstream) payload elements, each of which includes header information and payload information. The message size parameter includes a value for the amount of payload information to be included in each payload element; this value can vary from a relatively small number of payload bytes to the maximum number of payload bytes allowed by the network (layer 2) protocol, typically about 1500.

In a preferred embodiment, the message size parameter is primarily responsive to the bit error rate (BER) experienced for the communication link between the BSC 120 and the CPE 130. When the bit error rate is relatively small, the message size parameter can be set to be relatively large, so as to reduce the amount of overhead for header information in each payload element. However, when the bit error rate is relatively larger, the message size parameter can be set to be relatively smaller, so as to reduce the amount of overhead for lost payload elements due to errors in one or more symbols of transmitted payload elements. The modulation selection parameter allows the BSC 120 to optimize a communication link with a selected CPE 130 in response to interference effects.

Those skilled in the art will recognize, after perusal of this application, that there is a relationship between the modulation type, error code type, and message size. Thus, where the modulation type allocates relatively fewer bits per symbol, the likelihood of error for any particular symbol is relatively lower, and the bit error rate will also be relatively lower. Similarly, where the error code type allocates relatively more error detection or correction bits per symbol, the likelihood of error for a particular symbol is also relatively lower, and the bit error rate will also be relatively lower. In those cases where the bit error rate is relatively lower, the message size parameter can be set to a relatively larger value.

Figure 9:
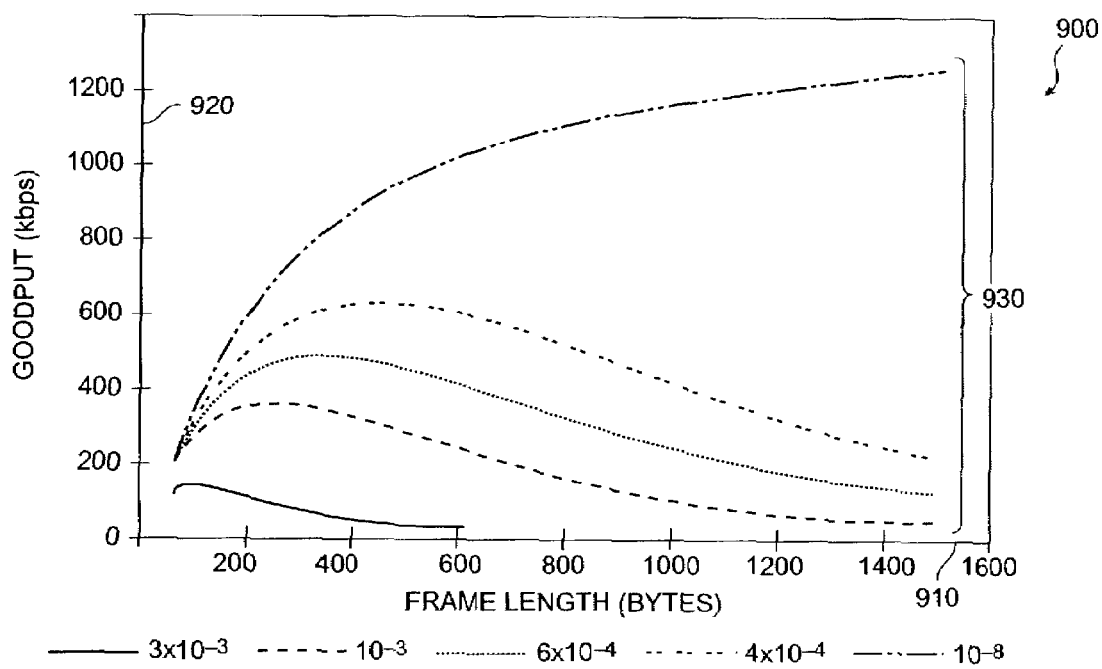
FIG. 9 shows a chart of increased throughput ("goodput") provided by the BSC 120 using message size selection.

FIG. 9 shows a chart of increased throughput ("goodput") provided by the BSC 120 using message size selection.

A chart 900 includes an X-axis 910 representing a message size or frame length for data transmission between the BSC 120 and the selected CPE 130, a Y-axis 920 representing a throughput value (in kilobits per second), a set of plotted curves 930 each representing a function coupling message size on the X-axis 910 with throughput on the Y-axis 920 for a known value of bit error rate (BER).

In a preferred embodiment, the BSC 120 selects, for each communication link with selected CPE 130, a message size parameter for the communication link. It would be clear to those of ordinary skill in the art, after perusal of this application, that selection of the message size parameter, is a tool for the BSC 120 to maximize the value of its communication link with each selected CPE 130.

acknowledgment and retransmission—As described in the Incorporated Disclosures, the BSC 120 and the CPE 130 exchange information using acknowledgment (ARQ) messages, so as to indicate to the sender whether or not the receiver has accurately received any particular payload element. If a particular payload element is not received, the sender can decide to retransmit that payload element a number of times, so as to attempt to having received correctly. The acknowledgment parameter selects how frequently acknowledgment messages are used to reply to payload elements, and thus how frequently to let the sender know whether those payload elements have been received. Similarly, the retransmission parameter selects how persistently the sender will attempt to send or resend payload elements to the receiver.

The acknowledgement parameter allows the BSC 120 to optimize a communication link with a selected CPE 130 in response to both interference effects and multipath effects.

Those skilled in the art will recognize, after perusal of this application, that there is a relationship between the application in use by the layer 5 application protocol and the choice of acknowledgment and retransmission parameters. For example, where the application includes voice transmission or other streaming media, there is little value in retransmitting any particular payload element, as the time for decoding and presenting that payload element is usually well passed by the time that particular payload element can be retransmitted by the sender and received by the receiver. On the contrary, for example, where the allocation includes file data transfer, there is relatively greater value in retransmitting each lost payload element, as each and every payload element is generally required for useful reception of the entire file data transfer.

Those skilled in the art will also recognize, after perusal of this application, that there is a relationship between choice of class of service (CoS) and quality of service (QoS) for other protocol layers and the choice of acknowledgment and retransmission parameters. For example, where the application includes data transfer or backup related applications, it might be desirable to assure that data sent from one device to another is well-assured to be correct. Thus, in such case, it might be desirable to adjust acknowledgment and retransmission parameters so that data transfer is assured to be as correct as possible as soon as possible.

Figure 10:
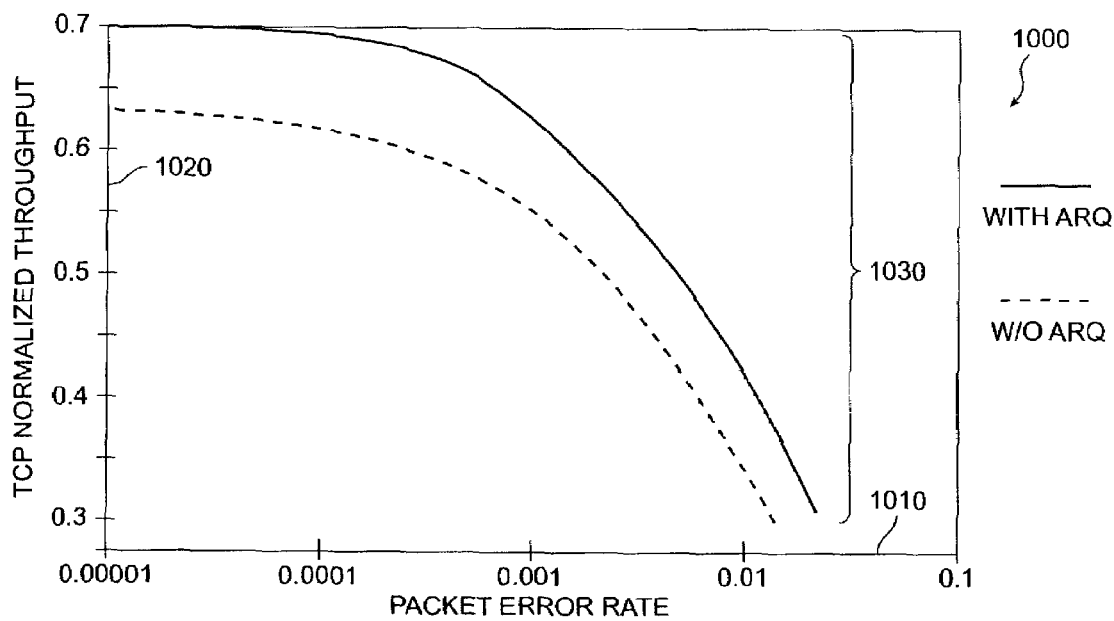
FIG. 10 shows a chart of increased throughput provided by the BSC 120 using acknowledgement and retransmission parameter selection.

FIG. 10 shows a chart of increased throughput provided by the BSC 120 using acknowledgement and retransmission parameter selection.

A chart 1000 includes an X-axis 1010 representing a packet error rate (PER) for data transmission between the BSC 120 and the selected CPE 130, a Y-axis 1020 representing a normalized throughput value, and a set of plotted curves 1030 each representing a function coupling PER on the X-axis 1010 with throughput on the Y-axis 1020 in response to whether dynamic acknowledgement and retransmission parameter selection is used or not.

In a preferred embodiment, the BSC 120 selects, for each communication link with selected CPE 130, a message size parameter for the communication link. It would be clear to those of ordinary skill in the art, after perusal of this application, that selection of whether or not to use dynamic acknowledgement and retransmission is a tool for the BSC 120 to maximize the value of its communication link with each selected CPE 130.

TDD duty cycle—As described in the Incorporated Disclosures, the BSC 120 and the CPE 130 exchange information using a downstream portion and an upstream portion of a TDMA transmission frame. The TDD duty cycle parameter selects how much of the TDMA transmission frame is allocated for downstream information transfer and how much of the team a transmission frame is allocated for upstream information transfer.

The TDD duty cycle parameter allows the BSC 120 to optimize a communication link with a selected CPE 130 in response to interference effects.

As described below, the BSC 120 maintains these physical parameters and MAC parameters, and adaptively modifies them with changing conditions on the communication link between the BSC 120 and the CPE 130. Thus, when the BSC 120 notices a change in characteristics of the communication link, it does not immediately alter the physical parameters and MAC parameters to correspond exactly to the new characteristics of the communication link. Rather, the BSC 120 maintains a sequence (of at least one) past sets of values of these parameters, and modifies the most recent set of parameters using the new characteristics, so as to adjust the set of parameters dynamically while allowing sets of values of these parameters to have persistent effect on future values.

In a preferred embodiment, the BSC 120 records each current value for the physical parameters and MAC parameters, determines exact values for the physical parameters and MAC parameters in response to characteristics of the communication link, and adaptively selects new values for the physical parameters and MAC parameters (thus, for the next TDMA frame) by linearly mixing current values with dynamic values. Operation of this technique is shown in the following equation 150:

$$\text{value}_{new} \leftarrow 1-\text{alpha}*\text{value}_{current}+\text{alpha}*\text{value}_{exact} \qquad (150)$$

where $\text{value}_{new}$=the new value of each parameter, for the next TDMA frame;

$\text{value}_{current}$=the current value of each parameter, for the most recent TDMA frame;

value$_{exact}$=the dynamic exact value of each parameter, determined in response to characteristics of the communication link;

and alpha=a hysteresis parameter for determining how fast to respond to changes in characteristics of the communication link.

In a preferred embodiment, the value of alpha is specific to each individual physical parameter and MAC parameter.

Method of Operation

Figure 11:
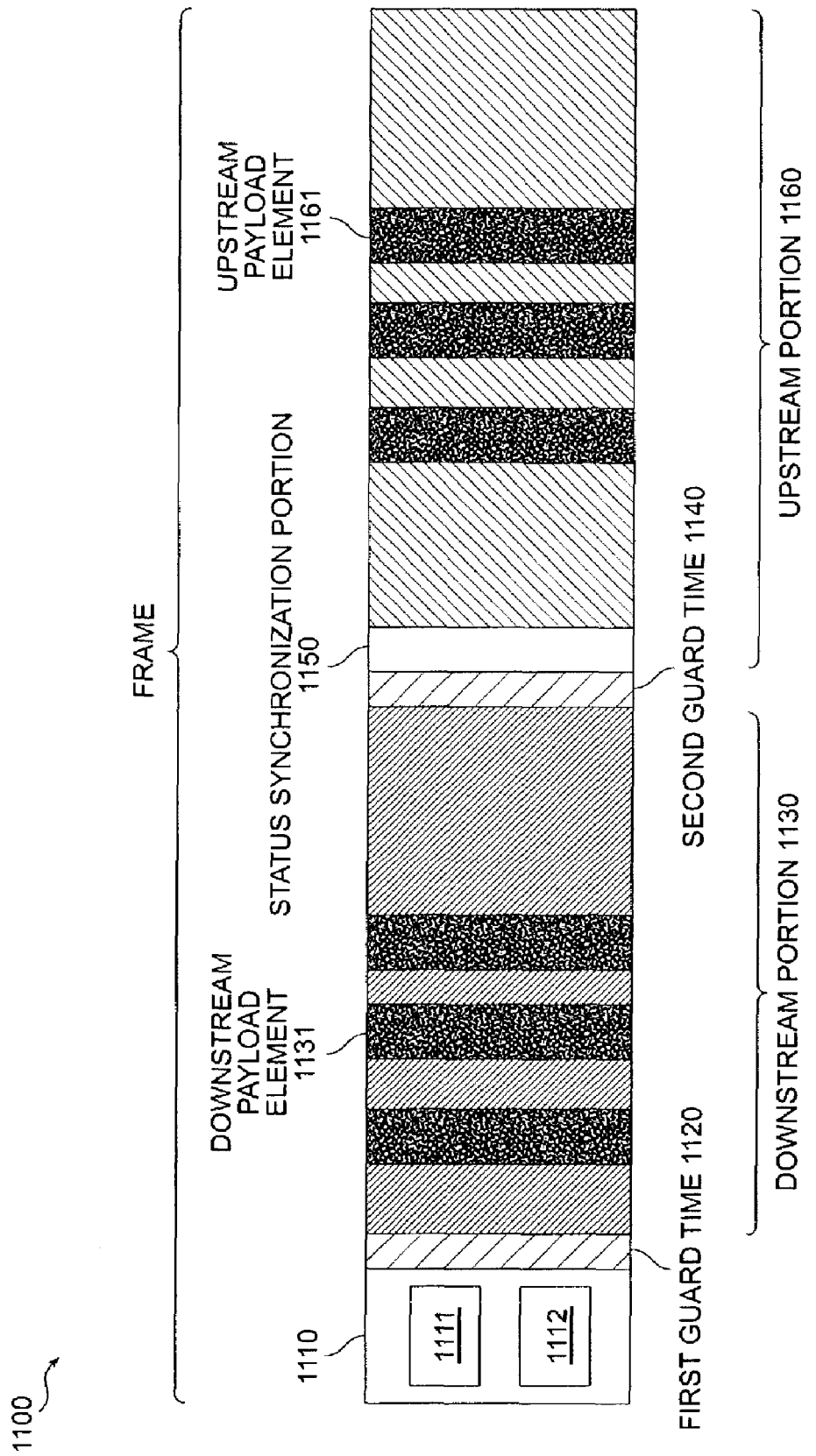
FIG. 11 shows a time division duplex frame used in a system as in FIG. 1.

FIG. 11 shows a time division duplex frame used in a system as in FIG. 1.

A time division duplex (TDD) frame 1100 includes a time-synchronization portion 1110, a first guard time 1120, a downstream portion 1130, a second guard time 1140, a status-synchronization portion 1150, and an upstream portion 1160.

The time-synchronization portion 1110 includes a first symbol 1111 indicating the beginning of the TDD frame 1100, and a sequence of parameter setting values 1112 for each CPE 130. The BSC 120 uses the parameter setting values 1112 to inform each selected CPE 130 individually and separately of (a) the PHY and MAC parameters the BSC 120 is using to send messages to that selected CPE 130, and (b) the PHY and MAC parameters the selected CPE 130 should use to send messages to the BSC 120 during its allocated part of the upstream portion 1160.

The first guard time 1120 includes a time duration sufficient for the BSC 120 to assure that all CPE 130 do not interfere with each other when receiving from the BSC 120 or sending to the BSC 120.

The downstream portion 1130 includes a sequence of downstream payload elements 1131, each sent by the BSC 120 to a selected CPE 130. The BSC 120 determines a length for each of these downstream payload elements 1131 and sends that information with the parameter setting values 1112 in the time-synchronization portion 1110. In alternative embodiments, the BSC 120 may divide the CPE 130 into classes and allocate one or more downstream payload elements 1131 for each class of CPE 130. For example, the BSC 120 may allocate one or more downstream payload elements 1131 for broadcast or multicast messages.

The second guard time 1140 includes a time duration sufficient for the BSC 120 to assure that the downstream portion 1130 and the status-synchronization portion 1150 do not interfere.

The status-synchronization portion 1150 includes a sequence of status information so that the BSC 120 can agree with each selected CPE 130 regarding higher-level protocol status out-of-band from those higher-level protocols.

Similar to the downstream portion, the upstream portion 1160 includes a sequence of upstream payload elements 1161, each sent by a selected CPE 130 to the BSC 120. The BSC 120 (not the CPE 130) determines a length for each of these upstream payload elements 1161 and sends that information with the parameter setting values 1112 in the time-synchronization portion 1110. In alternative embodiments, the BSC 120 may divide the CPE 130 into classes and allocate one or more upstream payload elements 1131 for each class of CPE 130, such as for upstream bandwidth contention.

Figure 12:
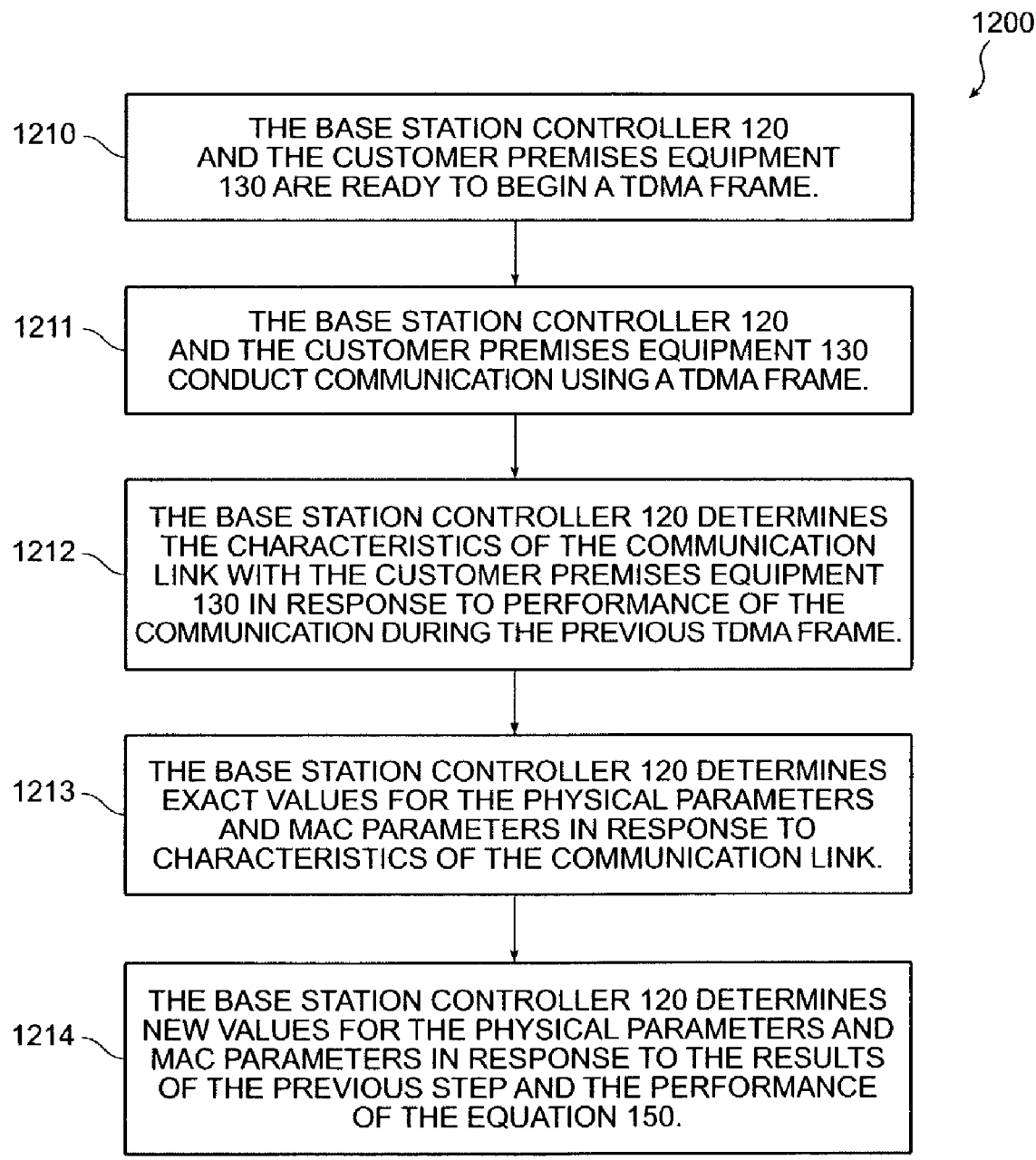
FIG. 12 shows a process flow diagram of a method for operating a system as in FIG. 1.

FIG. 12 shows a process flow diagram of a method for operating a system using adaptive point to multipoint wireless communication in a wireless communication system.

A method 1200 includes a set of flow points and a set of steps. The system 100 performs the method 1200. Although the method 1200 is described serially, the steps of the method 1200 can be performed by separate elements in conjunction or in parallel, whether asynchronously, in a pipelined manner, or otherwise. There is no particular requirement that the method 1200 be performed in the same order in which this description lists the steps, except where so indicated.

At a flow point 1210, the BSC 120 and the CPE 130 are ready to begin a TDMA frame.

At a step 1211, the BSC 120 and the CPE 130 conduct communication using a TDMA frame. As part of this step, the BSC 120 directs the CPE 130 regarding which physical parameters and MAC parameters to use.

At a step 1212, the BSC 120 determines characteristics of the communication link with the CPE 130, in response to performance of the communication during the previous TDMA frame.

At a step 1213, the BSC 120 determines exact values for the physical parameters and MAC parameters in response to characteristics of the communication link.

At a step 1214, the BSC 120 determines new values for the physical parameters and MAC parameters in response to results of the previous step, and performance of the equation 150.

After this step, the BSC 120 and the CPE 130 have performed one step of sending and receiving information using a TDMA frame. The flow point 1210 is reached repeatedly and the steps thereafter are performed repeatedly, for each TDMA frame.

Generality of the Invention

The invention has general applicability to various fields of use, not necessarily related to the services described above. For example, these fields of use can include one or more of, or some combination of, the following:

- The invention is applicable to other forms of wireless communication, such as frequency division multiple access (FDMA) or code division multiple access (CDMA, also known as spread spectrum communication);
- The invention is applicable to any non-wireless communication, in which relative effectiveness or efficiency of communication can be achieved from dynamically adjusting communication parameters, such as physical parameters or MAC parameters. For example, the invention can be generalized to non-wireless communication using modems in which equalization parameters are to be dynamically adjusted.
- The invention is applicable to other wireless communication systems, such as satellite communication systems and (microwave tower or other) point to point transmission systems.
- The invention is applicable to both fixed wireless communication systems, in which customer premises equipment do not move relative to the BSC 120, and to mobile wireless communication systems, and which customer premises equipment move substantially relative to the BSC 120.

Other and further applications of the invention in its most general form, will be clear to those skilled in the art after perusal of this application, and are within the scope and spirit of the invention.

Although preferred embodiments are disclosed herein, many variations are possible which remain within the concept, scope, and spirit of the invention, and these variations would become clear to those skilled in the art after perusal of this application.

The invention claimed is:

1. A method, including determining a message size responsive to a bit error rate of a communication link, independent of a number of data bits to be sent in a TDMA system;

receiving a message having a plurality of data bits, said plurality of data bits being more than can be sent within said message size;

sending, within a TDMA frame in said TDMA system, a section within said frame including (a) a set of parameters for sending said data bits, and (b) a number of allocated messages of said message size sufficient to send said message;

fragmenting said message into a initial element and one or more remainder elements responsive to said allocated number of messages, said initial element and said remainder elements can be sent within said message size;

sending said initial element;

waiting for an acknowledgment of said initial element;

(a) upon receiving said acknowledgement, sending one or more of said remainder elements, and (b) upon not receiving said acknowledgement within a selected time, transmitting a portion of said message corresponding to a dynamically determined new said initial element.

2. A base station controller including one or more antennas for sending and receiving information over a communication link;

a processor; and a memory that stores data and instructions executable by the processor to control sending and receiving information over the communication link, the instructions including step of:

determining a message size responsive to a bit error rate of a communication link, independent of a number of data bits to be sent in a TDMA system;

receiving a message having a plurality of data bits, said plurality of data bits being more than can be sent within said message size;

sending, within a TDMA frame in said TDMA system, a section within said frame including (a) a set of parameters for sending said data bits, and (b) (b) a number of allocated messages of said message size sufficient to send said message;

fragmenting said message into a initial element and one or more remainder elements responsive to said allocated number of messages, said initial element and said remainder elements can be sent within said message size;

sending said initial element;

waiting for an acknowledgment of said initial element;

(a) upon receiving said acknowledgement, sending one or more of said remainder elements, and (b) upon not receiving said acknowledgement within a selected time, transmitting a portion of said message corresponding to a dynamically determined new said initial element.

3. A memory storing information including instructions, the instructions executable by a processor to control sending and receiving information over a communication link, the instructions including steps of:

determining a message size responsive to a bit error rate of a communication link, independent of a number of data bits to be sent in a TDMA system;

receiving a message having a plurality of data bits, said plurality of data bits being more than can be sent within said message size;

sending, within a TDMA frame in said TDMA system, a section within said frame including (a) a set of parameters for sending said data bits, and (b) (b) a number of allocated messages of said message size sufficient to send said message;

fragmenting said message into a initial element and one or more remainder elements responsive to said allocated number of messages, said initial element and said remainder elements can be sent within said message size;

sending said initial element;

waiting for an acknowledgment of said initial element;

(a) upon receiving said acknowledgement, sending one or more of said remainder elements, and (b) upon not receiving said acknowledgement within a selected time, transmitting a portion of said message corresponding to a dynamically determined new said initial element.

* * * * *